Figure 1:
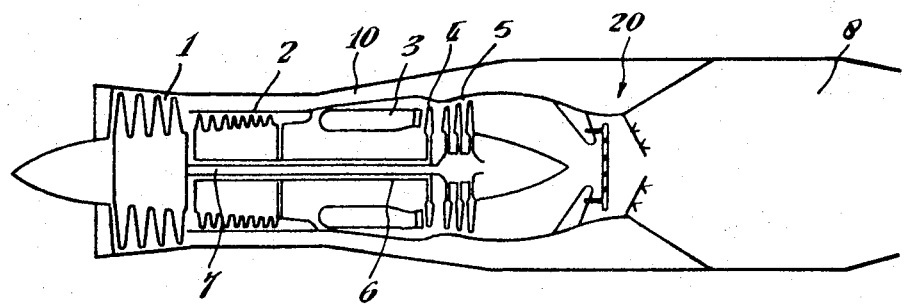

United States Patent

[11] 3,633,362

[72] Inventors Arthur Sotheran;
John S. Lewis, both of Filton, Bristol, England
[21] Appl. No. 824,080
[22] Filed May 13, 1969
[45] Patented Jan. 11, 1972
[73] Assignee Rolls-Royce Limited
Derby, England
[32] Priority May 16, 1968
[33] Great Britain
[31] 23,255/68

[54] REHEAT COMBUSTION APPARATUS FOR BYPASS GAS TURBINE ENGINES
3 Claims, 2 Drawing Figs.
[52] U.S. Cl. .................................................. 60/39.72, 60/261
[51] Int. Cl. ..................................................... F02k 3/10
[50] Field of Search ........................................ 60/39.72, 261, 262, 244

[56] References Cited
UNITED STATES PATENTS

| | | | |
|---|---|---|---|
| 3,540,216 | 11/1970 | Quillevere .................... | 60/39.72 |
| 3,043,101 | 7/1962 | Lefebvre ...................... | 60/261 |
| 3,046,742 | 7/1962 | Egbert .......................... | 60/39.72 |
| 3,150,484 | 9/1964 | Oldfield ........................ | 60/261 |
| 3,330,117 | 7/1967 | Coplin .......................... | 60/261 |
| 3,465,525 | 9/1969 | Cowley ......................... | 60/261 |
| 3,479,823 | 11/1969 | Parnell ......................... | 60/39.72 |

*Primary Examiner*—Douglas Hart
*Attorney*—Mawhinney & Mawhinney

ABSTRACT: A reheat system for a bypass gas turbine jet propulsion engine comprises a device at the downstream end of the bypass duct which both mixes the bypass air with the hot gas stream and provides a stable zone for combustion of the cold air. Fuel injectors are provided to supply the fuel to the stable zones. The device is used in combination with a normal reheat device in the hot gas stream.

When reheat is not required the mixing device gives the advantage of mixing the hot and cold streams with a gain in thrust, and when reheat is required the device allows the cold air to be burned under more favorable conditions.

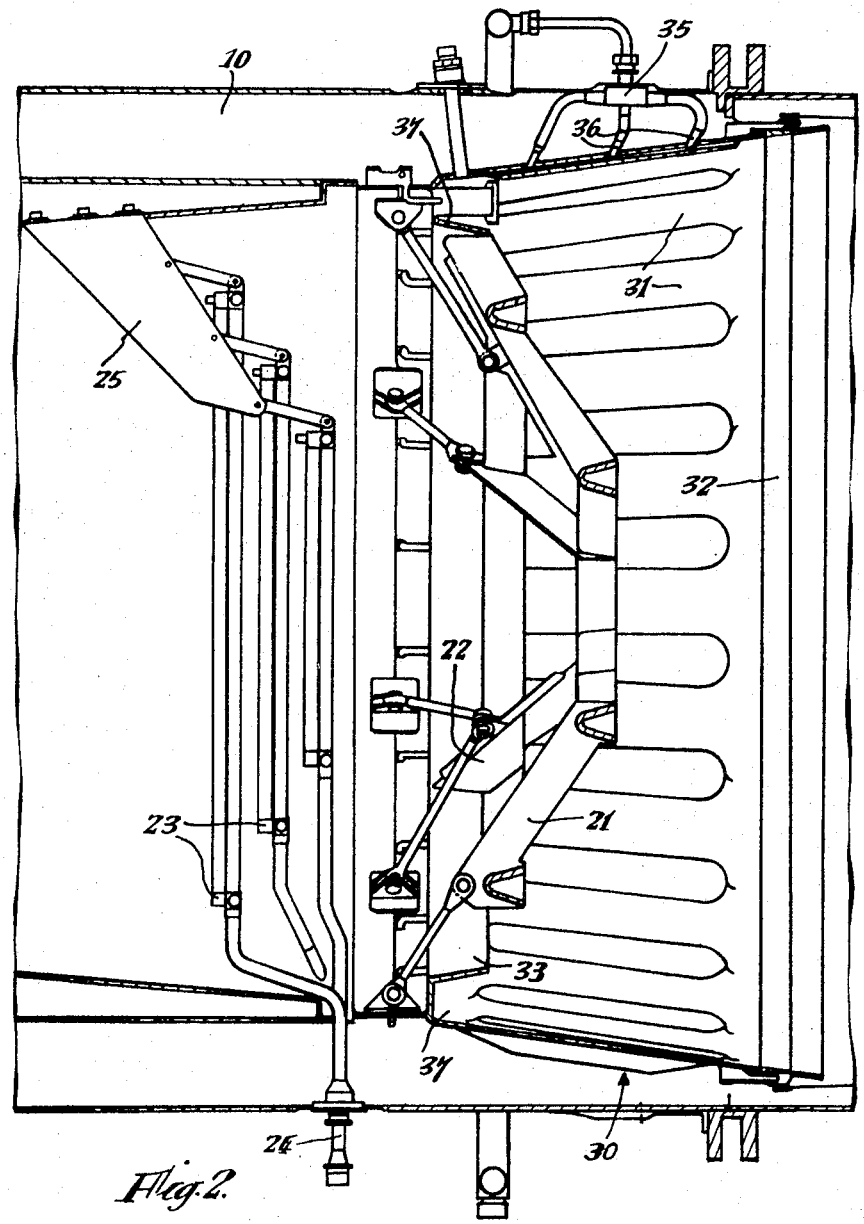

REHEAT COMBUSTION APPARATUS FOR BYPASS GAS TURBINE ENGINES

The present invention relates to bypass gas turbine jet propulsion engines and has particular reference to reheat systems therefor, by which the bypass air and the hot gas stream exhausted from the engine turbine may be further heated.

Two basic systems have previously been proposed for this purpose. The first involves supplying fuel separately to the cold bypass air and the hot gas stream and establishing separate combustion processes therein before the streams pass into a common nozzle. This system has a disadvantage that in the reheat-off case the thrust gain which could be obtained by deliberately mixing the bypass air with the hot gas stream is lost. Difficulties have also been encountered in burning efficiently in the low temperature bypass air.

The second system proposed is to mix the hot gas and bypass streams and then to burn additional fuel in the mixed stream. Disadvantages of this system are that in order to get efficient burning in the mixed stream, thorough mixing of the streams must first be accomplished. This requires a mixing length to be available between the mixers and the burners which adds weight to the engine. Further, pressure losses are produced in both the mixers and the burners.

According to the present invention a bypass gas turbine jet propulsion engine is provided with a reheat system comprising a combined flow-mixing and flame-stabilizing device, disposed at the downstream end of the bypass duct, which device acts to mix the bypass stream and the hot gas stream, and to produce zones of stabilized flow in the bypass stream in which fuel may be burned, and fuel injection means for selectively supplying fuel to said zones of stabilized flow.

Preferably the combined flow-mixing and flame-stabilizing device comprises a truncated conical member with circumferentially spaced elongate apertures in the walls thereof. The apertures are defined between a plurality of circumferentially spaced members which extend longitudinally of the device and whose width is small in comparison to their lengths. The members, known as longerons, extend across the bypass duct from an upstream point on the radially inner wall thereof to a downstream point on the radially outer wall thereof, thereby providing a plurality of obstructions to fluid flowing in the bypass passage, capable of producing wakes in said fluid flow in which a flame may be stabilized, and defining between the obstructions flow passages through which fluid from the bypass duct will be mixed with the hot gas stream.

The annular end portion of small diameter may be turned through 180° to form a substantially U-shaped nose, so that when the device is in position the nose will form a stable wake in the hot gas stream flow into which fuel may be injected and burned, to form a stable pilot zone of hot gas to aid in the burning of the air in the wakes of the longerons. Alternatively, hot gas from the hot gas stream may be led into the wake behind the nose to aid ignition and burning of the gases in the wakes of the longerons.

The reheat system may comprise further flame stabilizing means and fuel injectors in the hot gas stream.

The flame stabilizing means in the hot gas stream may be conventional ring gutters of V-shaped cross section and the fuel injectors in the hot gas stream may be of any suitable type.

The invention will now be more particularly described, merely by way of example, with reference to the accompanying drawings in which:

FIG. 1 illustrates diagrammatically a bypass gas turbine jet propulsion engine to which the invention has been applied and FIG. 2 illustrates a more detailed sectional elevation of the reheat combustion system of FIG. 1.

Turning now to FIG. 1 there is shown a bypass gas turbine jet propulsion engine having a low-pressure compressor 1, a high-pressure compressor 2, combustion equipment 3, a high-pressure turbine 4, and a low-pressure turbine 5 all in flow series. The high-pressure compressor 2 is drivingly connected to the high-pressure turbine 4 by means of a shaft 6 and the low-pressure compressor 1 is drivingly connected to the low-pressure turbine 5 by means of a shaft 7 which extends through and is concentric with the shaft 6.

The hot gas stream which is exhausted from the low-pressure turbine in operation passes into a jet pipe 8 which terminates in a jet nozzle (not shown) through which the exhaust gases pass to atmosphere to produce a propulsive thrust.

Part of the air compressed by the low-pressure compressor 1 passes into a bypass duct 10 through which said air may pass to the jet pipe without passing through the combustion equipment or the turbines.

A reheat system indicated generally by the reference numeral 20 is disposed downstream of the low-pressure turbine 5 and consists of two separate parts.

Referring now to FIG. 2 the reheat system 20 is shown on a larger scale.

The first of the two parts comprises annular V-shaped gutters 21 supported in the hot gas stream by means of struts 22. The gutters produce wakes of stabilized flow, in which combustion may be supported. Fuel is supplied to the hot gas stream upstream of the gutters 21 by means of fuel injectors 23 which are selectively supplied with fuel from a manifold 24. A strut 25 supports the fuel injectors in the hot gas stream.

The second part comprises a frustoconical flame tube or colander 30 which is disposed at the downstream end of the bypass passage and which consists of a plurality of circumferentially spaced longerons 31 extending between annular end portions 32 and 33. The downstream end portion 32 is connected to the downstream end of the passage by means of an annular beam to allow relative movement between the portion 32 and the flame tube, and the end portion 32 forms a sliding seal with the inner wall of the bypass passage. The longerons thus lie obliquely across the bypass passage and form a partial blockage at the downstream end thereof and the flame tube is mounted so as to be capable of movement relative to the surrounding structure. A fuel supply manifold 35 is provided through which fuel is supplied to a plurality of fuel injectors 36 disposed at angularly spaced-apart stations around the colander 30 so as to be capable selectively of injecting fuel between the longerons 31.

The upstream end portion 33 is formed with a U-shaped cross section so forming a nose 37 which extends into the hot gas stream. The nose member 37 is in fact the upstream end of a colander 30, which is sheet metal, turned inwardly and back on itself to provide a flame stabilizing member of "U" cross section like the gutters 21. The axial extent of the metal which has been turned under is shown by the dotted line 45 in FIG. 2 of the drawing. The line 45 is shown dotted because it is hidden behind the gutter.

In operation the bypass air flowing down the duct 10 is forced to turn inwardly due to the lateral contraction of the flow area and thus provides a series of substantially rectangular air jets having a radially inwardly directed component of velocity. A proportion of the flow, however, recirculates into the wakes behind the longerons and provides a stabilized flow pattern which is suitable for sustaining combustion in the relatively cold bypass air.

A proportion of the hot gas flow is also induced to flow outwardly into the wakes behind the longerons and this promotes mixing of the two streams as well as assisting in burning fuel in the longeron wakes when desired.

The nose 37 extending into the hot gas stream provides a stable zone into which fuel may be injected and burned or into which hot gases may be fed to assist burning in the colander 30.

The reheat system may be operative or nonoperative while the engine is running by selection of fuel supply.

In the reheat-off case, the colander acts as an effective mixing device for mixing the relatively cold bypass air and the hot gas stream, thorough mixing being obtained in the jet pipe between the colander and the nozzle, thereby increasing the thrust.

In the reheat-on case, the colander acts as an effective burner for relatively cold bypass air while the gutters 21 and the fuel injectors 23 effectively provide for combustion in the exhaust gas flow.

This reheat system thereby obviates the disadvantage of the previously described "mix then burn" system by using the same length of jet pipe for both mixing and burning.

Further, since the two parts of the reheat system act separately each may be used to the best effect in the two streams of different temperatures and pressures.

We claim:

1. A gas turbine engine having compressor means, combustion equipment and turbine means in flow series for producing a stream of hot gases, a hot gas duct for said stream of hot gases, and a bypass duct adapted to receive some of the air compressed by the compressor means to form a bypass stream, the bypass duct surrounding the hot gas duct and terminating in a downstream end from which the bypass stream is caused to emerge to be mixed with the hot gas stream, a reheat system comprising flame-stabilizing means in the hot gas duct to provide zones of stabilized flow in the hot gas stream, fuel supply means selectively operable to supply fuel to the hot gas stream by injecting it into said zones of stabilized flow, a combined flow-mixing and flame-stabilizing device disposed at the downstream end of the bypass duct, said device causing the bypass stream to mix with the hot gas stream and to provide zones of stabilized flow in the bypass stream and fuel injection means for selectively supplying fuel to said zones of stabilized flow, said flow-mixing and flame-stabilizing device comprising a plurality of circumferentially spaced-apart and obliquely extending longerons adapted to be disposed in the bypass duct so that an upstream point on each longeron lies at a lesser radius than a point downstream thereof, thereby providing a plurality of obstructions in the bypass duct capable of producing wakes in the bypass stream so that a flame immediately downstream of the end of the bypass duct may be stabilized and defining between the obstructions flow passages through which the bypass stream is caused to be mixed with the hot gas stream, the flow-mixing and flame-stabilizing device further comprising a truncated conical member having means defining circumferentially spaced elongate apertures extending substantially the whole length of the member.

2. A reheat system according to claim 1 and in which the end of the conical member which is of lesser radius is made in the form of an annular nose having substantially U-shaped cross section, and extending radially inwardly of the member, the nose being disposed in the hot gas duct with the open end of the U-shaped section facing downstream so that a stable combustion zone is formed behind the nose, which zone is in communication with the stabilized zones behind the longerons for combustion propagation along the longerons.

3. A reheat system according to claim 2, and in which hot gases from the hot gas stream are caused to be fed into the stable zone downstream of the nose.

* * * * *